United States Patent
Cha et al.

(10) Patent No.: US 9,022,463 B2
(45) Date of Patent: May 5, 2015

(54) REAR-SEAT ARMREST LOCKING APPARATUS

(71) Applicants: Hyundai Motor Company, Seoul (KR); Kia Motors Corporation, Seoul (KR)

(72) Inventors: Ju Hyun Cha, Gyeonggi-do (KR); Sang Do Park, Gyeonggi-do (KR); Hak Gyun Kim, Gyeonggi-do (KR); Tae Hoon Lee, Seoul (KR); Dong Woo Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 122 days.

(21) Appl. No.: 13/846,897

(22) Filed: Mar. 18, 2013

(65) Prior Publication Data
US 2014/0125107 A1 May 8, 2014

(30) Foreign Application Priority Data
Nov. 8, 2012 (KR) .......................... 10-2012-0125859

(51) Int. Cl.
*A47C 13/00* (2006.01)
*B60N 2/46* (2006.01)

(52) U.S. Cl.
CPC .................................... *B60N 2/4613* (2013.01)

(58) Field of Classification Search
USPC ...................... 297/113, 411.32, 151, 234, 238
See application file for complete search history.

(56) References Cited

U.S. PATENT DOCUMENTS

| | | | | |
|---|---|---|---|---|
| 1,587,253 A | * | 6/1926 | Tarbox | 297/35 |
| 2,584,481 A | * | 2/1952 | Mast et al. | 297/115 |
| 2,824,599 A | * | 2/1958 | Quinlan | 297/146 |
| 4,807,928 A | * | 2/1989 | Cone | 297/153 |
| 4,848,840 A | * | 7/1989 | Toya | 297/411.32 |
| 4,968,092 A | * | 11/1990 | Giambrone | 297/151 |
| 5,752,739 A | * | 5/1998 | Saeki | 297/113 |
| 5,947,554 A | * | 9/1999 | Mashkevich | 297/115 |
| 6,089,654 A | * | 7/2000 | Burstein | 297/151 |
| 6,132,128 A | * | 10/2000 | Burrows | 403/96 |
| 8,827,369 B2 | * | 9/2014 | Izawa et al. | 297/411.32 |

FOREIGN PATENT DOCUMENTS

| | | |
|---|---|---|
| JP | 2007-526054 A | 9/2007 |
| KR | 2001-0061864 A | 7/2001 |

* cited by examiner

*Primary Examiner* — David E Allred
(74) *Attorney, Agent, or Firm* — McDermott Will & Emery LLP

(57) ABSTRACT

A rear-seat armrest locking apparatus includes a release lever installed in an armrest to generate a pulling force, a link guide connected with the release lever through a release cable to provide a pulling force, and installed inside the armrest to move up and down, a link connected with the link guide to turn an up-and-down linear movement to a lateral movement, a locking pin connected with the link to laterally move by means of the pulling force transferred from the link, and being released from a locking hole of a side fixing plate, and a spring installed on the locking pin to return the locking pin to an original position of the locking pin and insert the locking pin into the locking hole. The rear-seat armrest locking apparatus prevents the armrest from being unfolded forward in a forward collision, thereby preventing an accident.

4 Claims, 6 Drawing Sheets

REAR-SEAT ARMREST LOCKING APPARATUS

CROSS-REFERENCE TO RELATED APPLICATION

This application claims, under 35 U.S.C. §119(a), the benefit of priority to Korean Patent Application No. 10-2012-0125859 filed on Nov. 8, 2012, the entire contents of which are incorporated herein by reference.

TECHNICAL FIELD

The present disclosure relates to a rear-seat armrest locking apparatus capable of preventing an armrest from being unintentionally unfolded forward when forward collision occurs.

BACKGROUND

Generally, a rear-seat armrest is rotatably mounted between both side seatbacks. In an ordinary state, as shown in FIG. 1, a rear-seat armrest 2 is folded inwardly toward seatbacks 1 and is thus vertically inserted between the seatbacks 1, and when necessary, the rear-seat armrest 2 is unfolded forward from the seatbacks 1.

When a passenger on a rear seat unfolds the armrest 2 forward when necessary, the rear-seat armrest 2 is positioned horizontally with respect to a rear-seat cushion 3, and one or more passengers on a vehicle may rest all their arms on the armrest 2 to maintain comfortable their postures, which allows the passengers to experience a gentle ride.

FIG. 2 is a perspective view showing a conventional rear-seat armrest rotation structure. An armrest rotation apparatus 4 includes a hinge bracket 5 which is hinge-coupled to both-side surfaces of a lower end portion of an armrest 2 via a central shaft 6 to rotatably support the lower end portion of the armrest 2.

The hinge bracket 5 is a "⊏"-shape plate, and the central shaft 6 is inserted through a hinge hole formed in both-side surfaces of the plate, such that the hinge bracket 5 is hinge-coupled to the both-side surfaces of the lower end portion of the armrest 2.

On the both-side surfaces of the hinge bracket 5 are formed guide holes 7 having a predetermined radius from the central shaft 6 in a rotation direction, and guide pins 8 are inserted through the guide holes 7 to be coupled to the both-side surfaces of the lower end portion of the armrest 2, such that as the guide pins 8 rotate up and down along the guide holes 7 to stably guide rotation of the armrest 2.

With such a rotation structure, an upper end portion of the armrest 2 rotates up and down with respect to the central shaft 6 of the hinge bracket 5, and when necessary, the armrest 2 is unfolded horizontally to rest an arm thereon.

However, the conventional rear-seat armrest 2 has no separate locking apparatus, such that in a forward collision with another car or object in front of the car, the armrest 2 becomes unfolded due to inertia and a passenger may bump into the unfolded armrest 2. This may threaten the passenger's safety.

In particular, when a child lies down on the rear seat, when the forward collision occurs, the armrest 2 rotates and hits a face of the child, causing a serious safety accident.

SUMMARY OF THE DISCLOSURE

Accordingly, the present inventive concept has been made to solve the foregoing problem, and provides a rear-seat armrest locking apparatus in which locking means such as two locking pins are added to lock an armrest, to prevent the armrest from being unfolded forward in a forward collision, thereby preventing an accident.

An aspect of the present disclosure provides a rear-seat armrest locking apparatus including a release lever installed in an armrest to generate a pulling force, and a link guide connected with the release lever through a release cable and installed inside the armrest to move up and down. The rear-seat armrest locking apparatus further includes a link connected with the link guide to turn an up-and-down linear movement to a lateral movement, a locking pin connected with the link to laterally move by means of the pulling force transferred from the link and be released from a locking hole of a side fixing plate, thereby unlocking the armrest, and a spring installed on the locking pin to return the locking pin to an original position of the locking pin and insert the locking pin into the locking hole, thereby locking the armrest.

In particular, the link guide is a plate and has a guide hole which is symmetric at both sides of the plate in a left and right rotation direction. A center portion of the link is hinge-coupled to the inside of the armrest. An upper end portion of the link is coupled to the guide hole in such a way to rotate along the guide hole to the left and to the right through a coupling protrusion. A lower end portion of the link is coupled with an end portion of the locking pin by using a coupling hole. As the link guide moves up and down, the link rotates to the left and to the right to lead the locking pin to move laterally.

The spring is disposed between a flange protrusion formed on the locking pin inside the armrest and a fixing bracket fixed inside the armrest to elastically support the locking pin, such that the spring is compressed by the flange protrusion in unlocking and inserts and fixes the locking pin into the locking hole by means of an elastic restoring force in locking.

BRIEF DESCRIPTION OF THE DRAWINGS

The above and other features of the present inventive concept will now be described in detail with reference to an exemplary embodiment thereof illustrated the accompanying drawings which are given hereinbelow by way of illustration only, and thus are not limitative of the present disclosure, and wherein.

DETAILED DESCRIPTION

Hereinafter, the present inventive concept will be described in detail with reference to the accompanying drawings to allow those of ordinary skill in the art to easily carry out the present inventive concept.

Figure 1:
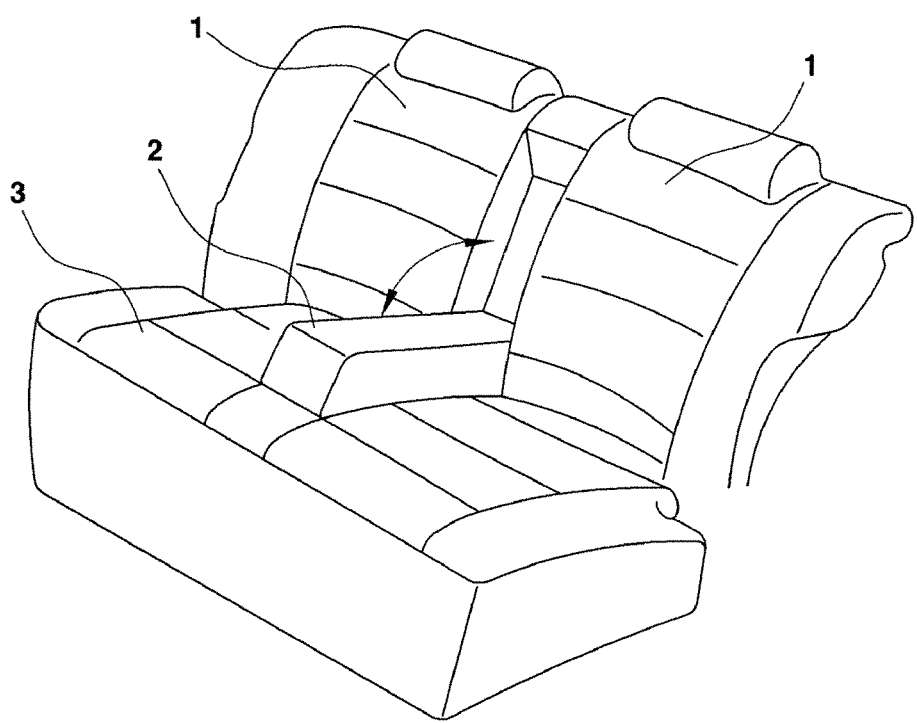
FIG. 1 is a perspective view illustrating that an armrest is installed in a conventional rear seat.
Figure 2:
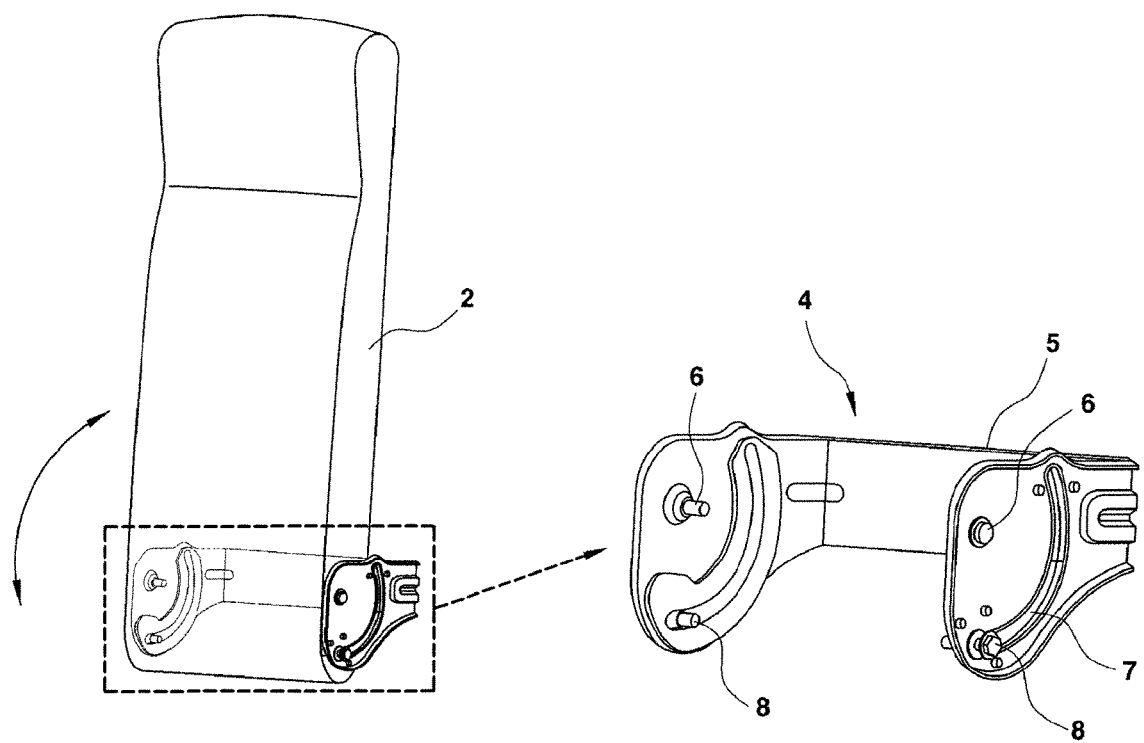
FIG. 2 is a perspective view illustrating a conventional armrest rotation apparatus.
Figure 3:
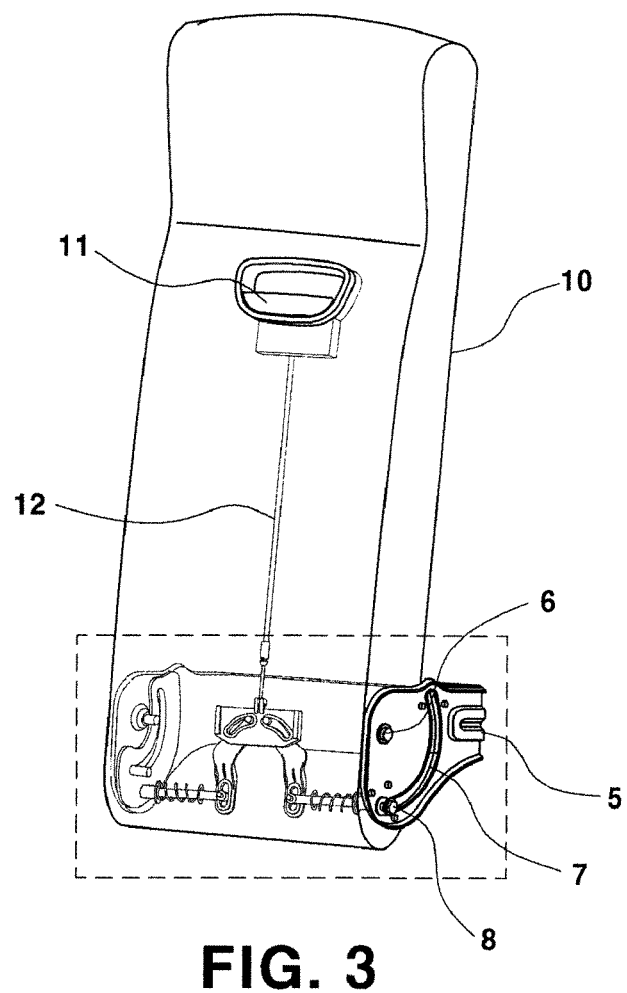
FIG. 3 is a perspective view illustrating an armrest locking apparatus according to the present disclosure.
Figure 4:
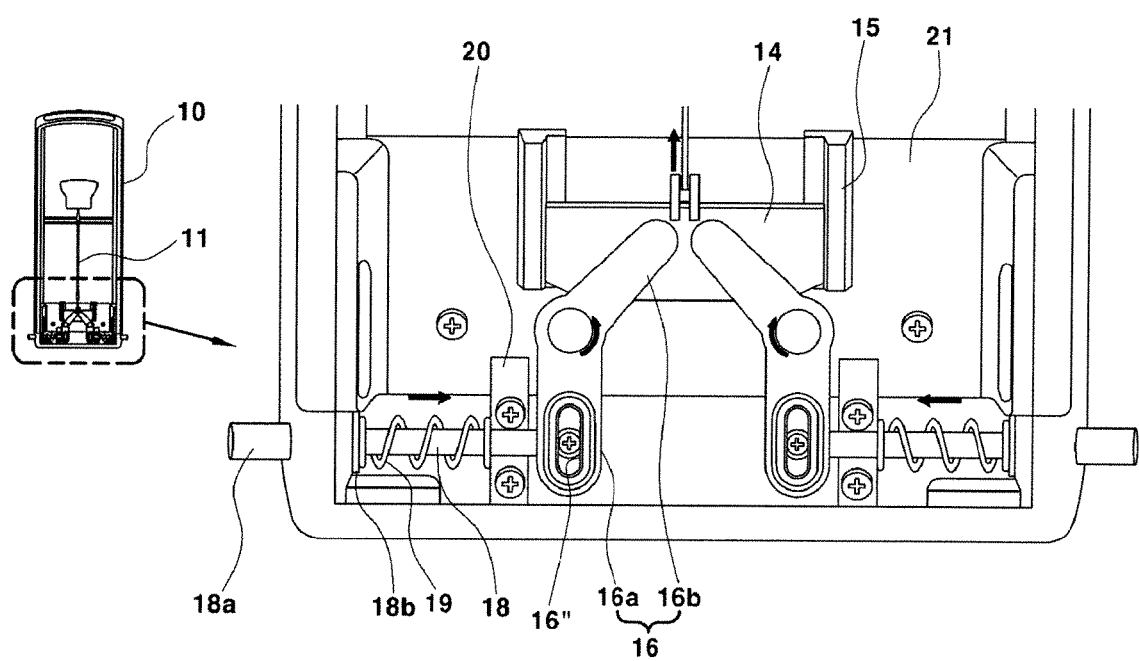
FIG. 4 is a rear view of the armrest locking apparatus of FIG. 3.

FIG. 3 is a perspective view illustrating an armrest locking apparatus according to the present disclosure, and FIG. 4 is a rear view of the armrest locking apparatus of FIG. 3.

The present disclosure relates to a rear-seat armrest locking apparatus in which an armrest locking means is additionally mounted on a hinge bracket 5 which rotatably supports an armrest to prevent an armrest 10 from being unintentionally unfolded forward, thereby preventing an accident caused by unfolding of the armrest 10 in a forward collision.

The hinge bracket 5 has the central shaft 6 and the guide pins 8 which have the same structures as conventional ones, and thus will not be described in detail.

The rear-seat armrest locking apparatus according to the present disclosure may include side fixing plates 13, locking pins 18, springs 19, links 16, a link guide 14, and a release cable 12.

The side fixing plates 13 are fan-shaped plates fixed to both-side surfaces of the hinge bracket 5, and include engagement protrusions 13b formed at predetermined intervals along an edge portion on the other surface of the plate, such that the side fixing plates 13 are inserted and fixed to the both-side surfaces of the hinge bracket 5 by using the engagement protrusions 13b.

In the side fixing plates 13 are formed guide holes 13a having the same shape and size as those of the guide holes 7 of the hinge bracket 5, and the guide pins 8 are inserted into the guide holes 13a to guide rotation of the armrest 10.

Locking holes for locking the armrest 10 are formed in lower end portions of the side fixing plates 13, and locking portions 18a of the locking pins 18 are inserted through the locking holes to lock the armrest 10. The same locking holes may be formed in the hinge bracket 5 to lock the armrest 10.

The locking pins 18 are disposed between the both side fixing plates 13 and are installed inside the armrest 10 to fix the armrest 10 by using the locking pins 18.

The locking pins 18 are disposed to move laterally from the locking holes of the side fixing plates 13, and the locking portions 18a are formed integrally at end portions of the locking pins 18 to have large diameters to be substantially inserted into or released from the locking holes.

In the present disclosure, the springs 19 are installed on the locking pins 18 to insert the locking pins 18 into the locking holes by using an elastic force of the springs 19.

On the locking pins 18 are formed the circular flange protrusions 18b in a diameter direction to have large diameters, and fixing brackets 20 are fixed to a base plate embedded in the armrest 10. In the fixing brackets 20 are formed support holes, and the locking pins 18 pass through the springs 19 and the support holes of the fixing brackets 20.

The springs 19 are positioned between the flange protrusions 18b of the locking pins 18 and the fixing brackets 20 to elastically support the locking pins 18, thereby allowing the locking pins 18 to move toward the side fixing plates 13 at all times.

As such, in a state where the springs 19 are positioned between the flange protrusions 18b and the fixing brackets 20, when the locking pins 18 are pulled toward the fixing brackets 20 from the side fixing plates 13 and are thus released from the locking holes, the flange protrusions 18b move together with the locking pins 18 in such a way to compress the springs 19. When a pulling force applied to the locking pins 18 is released, the locking pins 18 return to its original state by means of an elastic restoring force of the springs 19 and thus the locking pins 18 are inserted into the locking holes.

In the present disclosure, the links 16, the link guide 14, and the release cable 12 are connected to the locking pins 18, such that the locking pins 18 may be released from the locking holes by laterally inwardly pulling the locking pins 18.

Each link 16 includes first and second wing portions 16a and 16b which are formed inclinedly at a predetermined angle bi-directionally from the center. A coupling hole 16" is formed long in a longitudinal direction at a lower end portion of the first wing portion 16a in such a way to be hinge-coupled with an end portion of the locking pin 18, and a coupling protrusion 16' is formed at an upper end portion of the second wing portion 16b in such a way to be hinge-coupled with a guide hole 14a of the link guide 14.

The center portion of the link 16 is hinge-coupled to the base plate embedded in the armrest 10 along a hinge shaft 17, such that both end portions of the link 16 may rotate around the hinge shaft 17 to the left and to the right.

The link guide 14 is structured as a plate, and has the guide hole 14a which is symmetric at the left and right sides of the plate and is in a circular shape having a predetermined curvature. The link guide 14 is overlappingly disposed in front of the second wing portion 16b and is hinge-coupled with the coupling protrusion 16' of the link 16 through the guide hole 14a.

The link guide 14 is mounted on the base plate embedded in the armrest 10 to move up and down, such that both side end portions of the link guide 14 are inserted into a guide groove of a guide rail 15 installed on the base plate and are guided in an up-and-down direction.

A cable fixing portion is formed in an upper center portion of the link guide 14, and a hole is formed in the cable fixing portion to allow an end portion of the release cable 12 to be connected therethrough, such that the link guide 14 may be pulled upwardly.

The release cable 12 connects a pulling means with the link guide 14, and a pulling force generated in the pulling means is transferred to the link guide 14.

A release lever 11 installed in a side of the armrest 10 may be used as the puling means, and the release lever 11 is spaced apart from the link guide 14 by a predetermined interval, such that a user may generate a pulling force by pulling the release lever 11.

The release lever 11 is elastically supported by the springs 19, such that when the release lever 11 is pulled and then released, the release lever 11 may return to its original position.

The operation state of the rear-seat armrest locking apparatus structured as described above will be described below.

Figure 5:
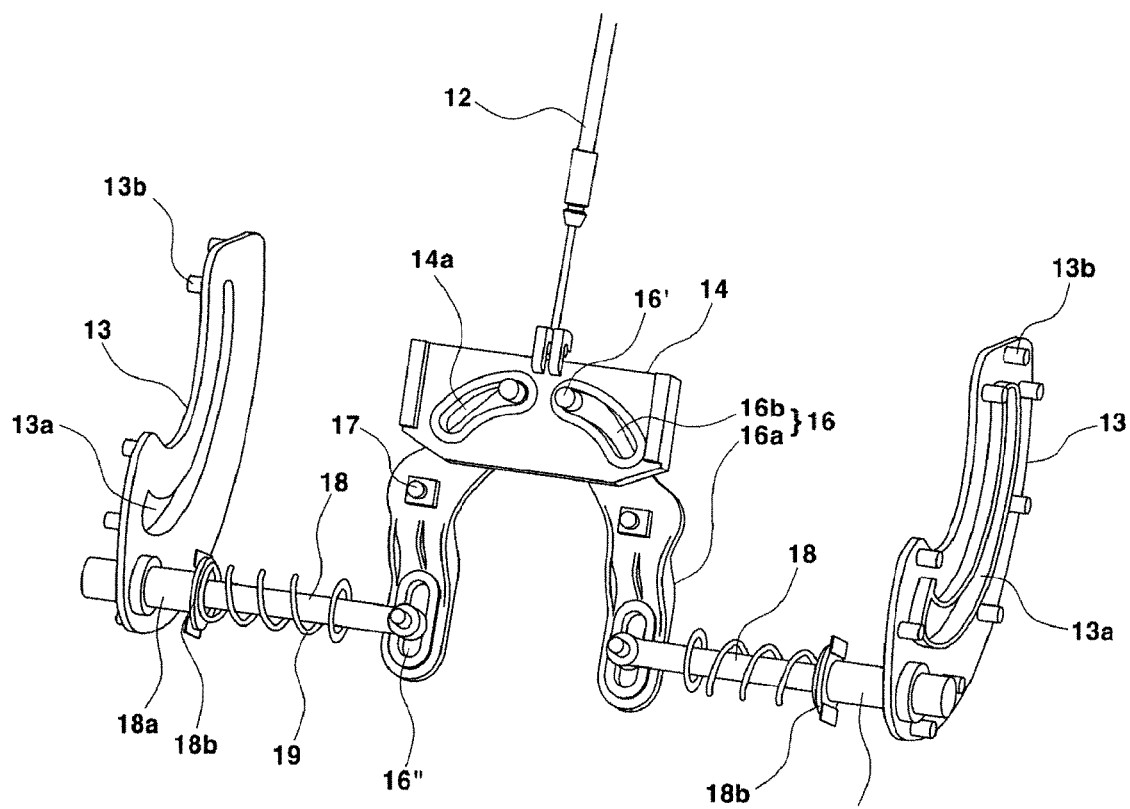
FIG. 5 is an operating state diagram showing a locked state of the locking apparatus in FIG. 3
Figure 6:
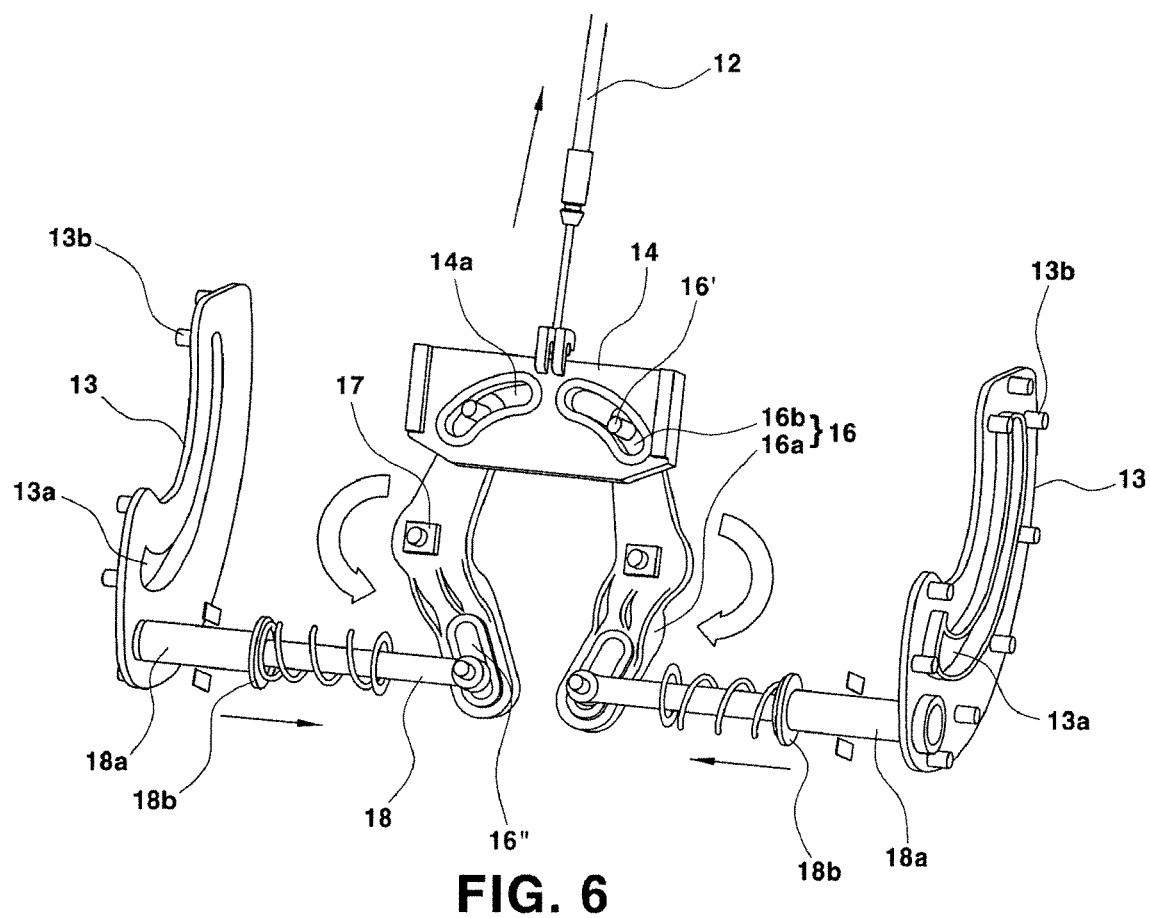
FIG. 6 is an operating state diagram showing an unlocked state of the locking apparatus in FIG. 3.

FIG. 5 is an operating state diagram showing a locked state of the locking apparatus in FIG. 3, and FIG. 6 is an operating state diagram showing an unlocked state of the locking apparatus in FIG. 3.

Initially, to use the armrest 10, the user pulls the release lever 11.

Once the release lever 11 is pulled, a pulling force is transferred to the link guide 14 through the release cable 12 and the link guide 14 moves upwardly, such that the coupling protrusion 16' of the link 16 is widened to the left and to the right along the guide hole 14a of the link guide 14.

At the same time, the lower wing portions 16a of the link 16 are narrowed laterally inwardly to each other and the locking pins 18 connected to the link 16 are pulled laterally, such that the locking portions 18a of the locking pins 18 are released from the locking holes of the side fixing plates 13, and thus unlocking is accomplished.

Next, the user pushes the armrest 10 forward to unfold the armrest 10 and comfortably rest the user's arm on the armrest 10.

When the armrest 10 is received in a receiving space inside the seatback to more efficiently use the rear-seat space in an ordinary state, the armrest 10 is fixed using a locking means such as the locking pins 18 installed in lateral lower end portions of the armrest 10, thereby preventing the armrest 10 from being unfolded forward.

Therefore, according to the present disclosure, by additionally providing locking means such as the locking pins 18, the link 16, the link guide 14, and the release cable 12 as well as the central shaft 6 and the guide pins 8, the locking means hold the armrest 10 to prevent the armrest 10 from being unfolded forward when the armrest 10 is about to be unfolded forward due to inertia in a forward collision, thereby preventing probable injuries which may be caused by collision between a passenger and the armrest 10.

Moreover, even in a forward collision occurring when a baby or a child lies down on the rear seat, the armrest 10 is prevented from being unfolded forward, thereby preventing an accident of the baby or the child occurring due to forward unfolding of the armrest 10.

The rear-seat armrest locking apparatus according to the present disclosure has the following advantages.

First, by additionally providing locking means such as the locking pins, the link, the link guide, and the release cable as well as the central shaft and the guide pins, the locking means hold the armrest to prevent the armrest from being unfolded forward when the armrest is about to be unfolded forward due to inertia in a forward collision, thereby preventing probable injuries which may be caused by collision between a passenger and the armrest; and Second, even in a forward collision occurring when a baby or a child lies down on the rear seat, the armrest is prevented from being unfolded forward, thereby preventing an accident of a baby or child due to a forward unfolding of the armrest.

| [Description of Reference Numerals] | |
|---|---|
| 5: Hinge Bracket | 6: Central Shaft |
| 7: Guide Hole | 8: Guide Pin |
| 10: Armrest | 11: Release Lever |
| 12: Release Cable | 13: Side Fixing Plate |
| 13a: Guide Hole | 13b: Engagement Protrusion |
| 14: Link Guide | 14a: Guide Hole |
| 15: Guide Rail | 16: Link |
| 16a: First Wing Portion | 16b: Second Wing Portion |
| 16': Coupling Protrusion | 16": Coupling Hole |
| 17: Hinge Axis | 18: Locking Pin |
| 18a: Locking Portion | 18b: Flange Protrusion |
| 19: Spring | 20: Fixing Bracket |

What is claimed is:

1. A rear-seat armrest locking apparatus comprising:
 a release lever installed in an armrest to generate a pulling force;
 a link guide connected to the release lever through a release cable to provide the pulling force, and installed inside the armrest to move up and down;
 at least one link connected to the link guide to turn an up-and-down linear movement to a lateral movement;
 at least one locking pin connected to the at least one link to laterally move by means of the pulling force transferred from the at least one link, and configured to be released from at least one locking hole of a side fixing plate, thereby unlocking the armrest; and
 at least one spring installed on the at least one locking pin to return the at least one locking pin to an original position of the at least one locking pin and insert the at least one locking pin into the at least one locking hole, thereby locking the armrest;
 wherein the link guide is a plate having a pair of arcuate guide openings coupled with the at least one link, the pair of arcuate guide openings being symmetric about the release cable.

2. The rear-seat armrest locking apparatus of claim 1, wherein a center portion of the at least one link is hinge-coupled to the inside of the armrest, an upper end portion of the at least one link is coupled to at least one of the guide openings in such a way to rotate along the at least one of guide openings to the left or to the right through at least one coupling protrusion, and a lower end portion of the at least one link is coupled with an end portion of the at least one locking pin by using a coupling hole, wherein as the at least one link guide moves up and down, the at least one link rotates to the left or to the right to lead the at least one locking pin to move laterally.

3. The rear-seat armrest locking apparatus of claim 1, wherein the at least one spring is disposed between at least one flange protrusion formed on the at least one locking pin inside the armrest and at least one fixing bracket fixed inside the armrest to elastically support the at least one locking pin, such that the at least one spring is compressed by the at least one flange protrusion in unlocking and inserts and fixes the at least one locking pin into the at least one locking hole by means of an elastic restoring force in locking.

4. The rear-seat armrest locking apparatus of claim 1, wherein the link guide is overlappingly disposed in front of at least one second wing portion and is hinge-coupled with the at least one coupling protrusion of the at least one link through at least one of the guide openings, such that the at least one coupling protrusion of the at least one link is displaced to the left or to the right along the at least one of the guide openings when the link guide moves upwardly.

* * * * *